Nov. 13, 1962    R. L. HUDSON    3,063,482
SCARFING ATTACHMENT FOR THE FINISHING OF ROUGH-CUT
SCARF JOINTS IN DIMENSION LUMBER
Filed Dec. 12, 1960    2 Sheets-Sheet 1
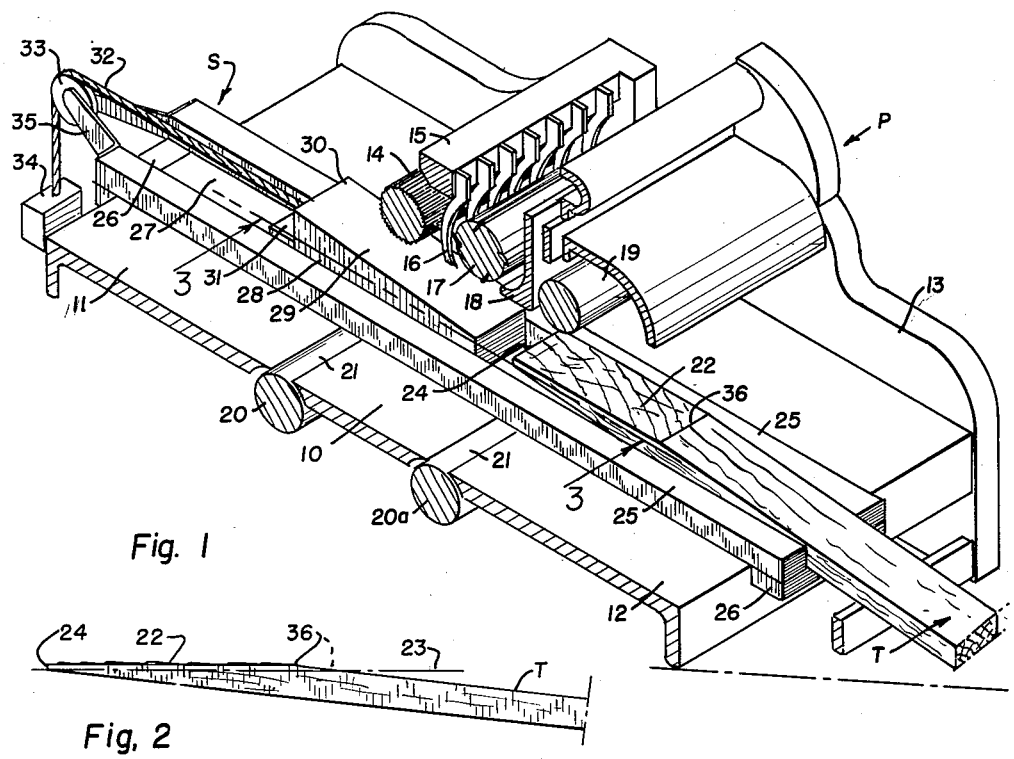
Fig. 1
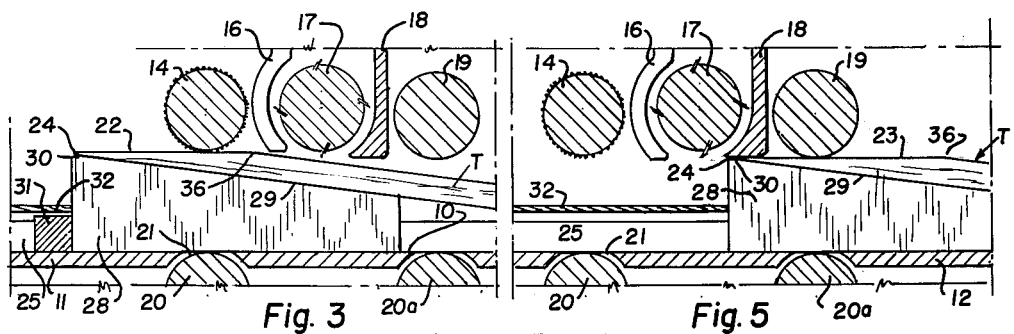
Fig. 2
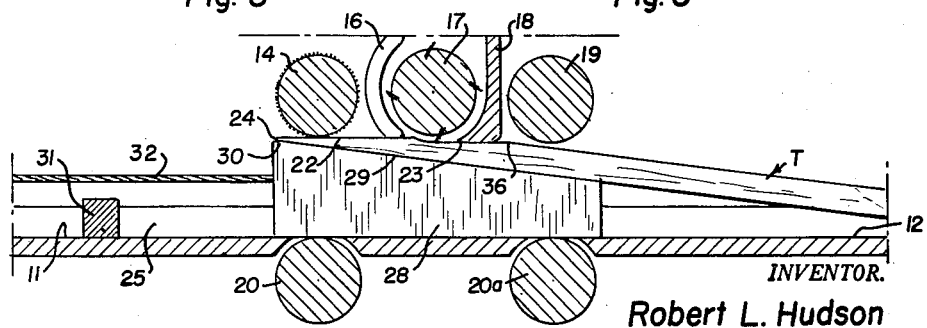
Fig. 3    Fig. 5
Fig. 4
INVENTOR.
Robert L. Hudson
BY WHITEHEAD, VOGL & LOWE
PER *Frank C. Lowe*
ATTORNEYS Nov. 13, 1962

R. L. HUDSON 3,063,482

SCARFING ATTACHMENT FOR THE FINISHING OF ROUGH-CUT
SCARF JOINTS IN DIMENSION LUMBER

Filed Dec. 12, 1960

INVENTOR.
Robert L. Hudson
BY WHITEHEAD, VOGL & LOWE
PER *Frank C. Lowe*
ATTORNEYS

United States Patent Office 3,063,482
Patented Nov. 13, 1962

3,063,482
SCARFING ATTACHMENT FOR THE FINISHING OF ROUGH-CUT SCARF JOINTS IN DIMENSION LUMBER
Robert L. Hudson, 4464 S. Washington St., Englewood, Colo.
Filed Dec. 12, 1960, Ser. No. 75,415
9 Claims. (Cl. 144—127)

This invention relates to apparatus for forming scarf joints in lumber and more particularly to scarfing attachments for wood working machinery, a primary object of the invention being to provide a novel and improved scarfing attachment which is specially adapted for the finishing of rough-cut scarf joints in dimension lumber. The invention will thus hereinafter be referred to as a scarfing attachment and while it will be described as for finishing rough-cut scarf joints in dimension lumber it also may be adapted for other purposes, as for cutting and finishing scarf joints in panel materials, plywood and the like.

Another object of the invention is to provide a novel and improved scarfing attachment which is especially adapted to be used with wood planing machines of the general type which include an overhead cutter and powered feed rolls at each side of the cutter. Such a planing machine will be hereinafter referred to as a planer.

Another object of the invention is to provide a novel and improved scarfing attachment for a planer which, by simple alteration, may finish scarf joints precisely at any selected pitch, such as from 5-to-1 to 12-to-1.

Another object of the invention is to provide a novel and improved scarfing attachment for a planer which permits a rough-cut scarf joint at an end of a timber to be finished as a smooth-surfaced, accurately-pitched scarf by a single pass through the planer.

Another object of the invention is to provide a novel and improved scarfing attachment for a planer which uses the normal cutting and feeding actions of the planer to obtain a self-feeding, semi-automatic scarf-finishing operation requiring only a single operator to handle the material as it is fed into the planer.

Yet another object of the invention is to provide a novel and improved scarfing attachment for a planer which is adapted to be quickly and easily affixed to or removed from a planer, and which does not require any attentions or adjustments to the planer which would interfere with the regular uses of the planer.

Yet other objects of the invention are to provide a scarfing attachment for a planer which is a simple, economical, easily operated, rugged and durable unit and is especially adapted for use in smaller wood working plants which need to produce scarf joints but cannot afford to invest in more elaborate and far more expensive, conventional types of scarfing machines.

With the foregoing and other objects in view, all of which more fully hereinafter appear, my invention comprises certain novel and improved constructions, combinations and arrangements of parts and elements as hereinafter described, defined in the appended claims and illustrated in the accompanying drawing in which:

FIGURE 1 is an isometric, sectional view of a planing machine with the improved scarfing attachment mounted thereon and with a timber having a rough-cut scarf joint positioned in the scarfing attachment guides preliminary to moving it into the machine for the scarf-finishing operation thereof.

FIGURE 2 is a side view of an end of a piece of dimension lumber, or timber, illustrating the general form of a rough-cut scarf joint and with a dashed line indicating the surface to which the scarf joint will be finished after it has been run through the planer.

FIGURE 3 is a fragmentary, sectional, elevational view of portions of the planer and the scarfing attachment thereon, as taken substantially from a vertical plane extending through the indicated line 3—3 at FIG. 1 but illustrating the timber as being inserted into the planer and in position to commence a scarf-finishing operation.

FIGURE 4 is a view similar to FIG. 3, but showing the scarf-finishing operation as being partially completed.

FIGURE 5 is a view similar to FIG. 3, but illustrating the completion of the scarf-finishing operation and with the timber about to be ejected from the machine.

Figure 6:
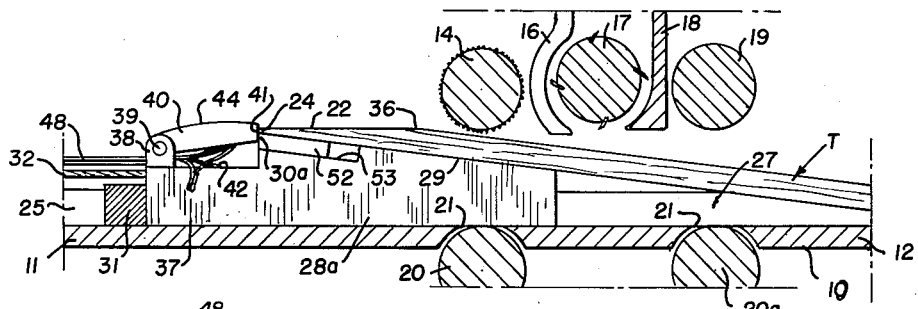
FIGURE 6 is a sectional, elevational view similar to FIG. 3, but illustrating a modified construction of the scarfing attachment which provides for a more precise finished cut with respect to the tip of the scarf and illustrates a timber as being inserted into the planer and in position to commence a scarf-finishing operation.

The art of splicing sections of lumber by gluing scarfed ends together is well known, and a number of machines have been developed for the specific purpose of cutting scarfs in ends of timbers. Also, attachments have been developed for planes and jointers for forming scarf joints. Some types of specially constructed scarfing machines are capable of a substantial production of accurate scarf cuts and such machines are indispensable in large lumber mills where scarf-cutting is a full-time operation. However, such machines are quite expensive and are altogether too costly for many smaller lumber mills and mills which require only occasional scarf cutting operations. On the other hand, the common scarf-cutting attachments for planes and jointers are essentially hand tools and while satisfactory if a few cuts are to be made, they are not suitable for any competitive production. Each cut requires too much time to finish.

It follows that there is a real and definite need for a scarfing attachment which may be used with the woodworking machinery available in most mills and which permits scarfs to be finished on a production basis, and which is competitive with larger mills having specialized machinery. With such in view, the present invention was conceived and developed and comprises, in essence, a scarf-finishing attachment for a conventional power-feed planer which is adapted to receive the end of a piece of lumber having a rough-cut scarf thereon and to precisely finish this scarf as fast as the material can be moved through the planer by its feed rolls. This attachment gives the small shop a means of producing precisely cut scarfs rapidly and accurately with an absolute minimum investment in equipment.

Referring more particularly to the drawing, FIG. 1 thereof shows my improved scarfing attachment S mounted in a planer P, which is of a conventional type that may be found in most wood shops. This planer P is shown somewhat diagrammatically and in section to illustrate only its primary operative elements and to better illustrate the manner in which the attachment S is mounted on the table 10 of the planer. In ordinary use, rough-cut dimension lumber is placed on this table 10, the infeed end 11 thereof to move longitudinally therethrough, and to be discharged from the outfeed end 12 thereof. This table lies between longitudinally disposed framework members 13 which upstand from each side thereof to support transversely disposed feeding, holding and cutting elements over the table. The position of these transversely-disposed elements is normally fixed and the elevation of the table surface may be varied with respect to the frame members to adjust the table to any selected thickness of finished material.

These feeding, holding and cutting elements include, in sequence, at least one spring-mounted, power-driven infeed roll 14 which is adapted to bear down and upon a piece of lumber or timber as to grip it and to push it into the cutting elements and across the table. Next, in sequence, is a transversely disposed chip breaker support frame 15 having a plurality of spaced chip breaker fingers 16 depending therefrom to bear down upon a timber fed therein. Next, in sequence, is a planer cutter head 17 which is powered to rotate rapidly to plane the top surface of the timber moving through the planer. The infeed roll 14 and chip breaker fingers 16 are spring mounted between the longitudinal frame members to yield vertically, while the cutter head is affixed to the frame and at a selected distance above the table. Therefore, the infeed roll and fingers will yield to conform to a varying thickness of a rough-cut timber passing through the planer while the fixed cutter head will plane the timber to the selected thickness, depending upon the adjustment of the table beneath the cutter.

The next element in sequence is a pressure bar 18 which is maintained at the same level as the cutter-head cutting surface and is on the outfeed side of the cutter head. The final element in the sequence is at least one power-driven outfeed roll 19 which rotates to push material out of the planer. This roll is also spring mounted and bears resiliently against the finished lumber surface to hold it down the same as the infeed roll 14 except its surface is smooth so that it will not corrugate or otherwise mar the finished surface of the freshly planed lumber.

The table surface is smooth to provide a free sliding action of material thereon. Preferably most planers will also include at least one lower infeed roll 20 and at least one lower outfeed roll 20a which are mounted in the table in suitable transverse slots 21 below the respective upper infeed and outfeed rolls. All of these feed rolls are power driven and are synchronized to rotate in unison to assure smooth movement.

In using the improved scarfing attachment, it is contemplated that standard dimension lumber, herein referred to as timbers, will be used so that all scarf cuts will be substantially identical to each other. Referring to FIG. 2, the end of a timber T will be first prepared for scarfing by a rough cut 22, in any desired manner as with a circular saw. This rough cut 22 is at the approximate pitch desired and is a suitable distance above the contemplated finished scarf surface 23 to permit the finishing operation to be completed by a single pass through the planer. While it is desirable to provide a narrow edge 24 of the scarf it has been found that a sharp edge in the rough cut is undesirable since it will easily splinter. An edge having a thickness of one thirty-second to one-eighth inch is much more satisfactory. The finished surface 23, however, will have a much narrower edge and may even be sharp.

In the embodiment illustrated at FIGS. 1 through 6 the scarf-finishing attachment S is made to be used with dimension lumber or timbers of a selected size and to finish a scarf at a selected pitch. The frame of the attachment includes two longitudinally disposed guide bars 25 which extend over each end of the table 10 and a short transversely-disposed lock bar 26 at the underside of each end of the guide bars which holds the guide bars 25 apart and in spaced parallelism to form a channel 27 between them. The lock bars 26 also abut against each vertical end of the table 10 to secure the frame onto the table 10.

The width of the channel 27 formed by and between the guide bars 25 is such as to slidably receive a timber T from the outfeed end of the table, as illustrated at FIG. 1, and to slidably hold a wedge-shaped gage-block 28 which has an inclined top surface 29 corresponding with the pitch of the scarf whereon the end of the timber is placed as hereinafter described. This gage-block 28 is proportioned for a given height setting of the table so that its peak point 30, at the trailing edge thereof in the direction of the cutting movement, will be not more than one-eighth inch below the cutting plane of the cutter head and at an elevation which will just clear the fingers 16 and infeed roll 14 when they are at their lowest position which is slightly below the cutting plane of the cutter. The actual height of the block is such that the projection of the inclined top surface 29 will not intersect the outfeed end of the table 10 when the block is at its initial operative position, under the infeed roll 14 as illustrated at FIGS. 1 and 3; thus, when a board is properly placed upon this inclined surface 29 with the rough-cut scarf facing upwardly, the board will not be inclined downwardly to a point where it will strike the outfeed edge of the table. It is also contemplated that the inclined top surface 29 of this gage-block 28 will be suitably roughened or otherwise conditioned to frictionally hold a board placed thereon. On the other hand, the under surface and sides of the gage-block will be smooth and finished so that it will easily move along the table and in the channel 27.

The gage block is adapted to be held at its initial operative position under the infeed roll 14 by a stop 31 mounted between the guide bars. It will then move from the infeed section 11 of the table to the outfeed section 12 when carrying a timber T responsive to the driving action of the infeed and outfeed rolls, as hereinafter described. It will finally return to the initial position against stop 31 when the scarf cut is finished and the lumber is ejected from the machine. To obtain this return action a cable 32 extends from the trailing edge of the gage-block 28, beyond the infeed edge of the table and over the pulley 33 and the cable is tensioned by a weight 34 hanging below the pulley. The pulley 33 is conveniently mounted upon struts 35 which outstand from the guide bars 25.

The initial position of the gage-block 28 against the stop 31 is such that whenever a timber is placed in the channel 27, with the rough-cut scarf 22 facing upwardly, and is pushed rearwardly into the machine to rest upon the top surface 29 of the gage-block, the rough-cut scarf surface will be wedged against and lift the infeed roll 14 with the point of contact being near the heel 36 of the scarf, as clearly illustrated at FIG. 3. The gage-block and timber will immediately be moved towards the cutter head by the driving action of the infeed roll 14. At the same time the pressure of the spring-loaded infeed roll will hold the timber on the sloping surface 29 to permit the cut surface 23 to be at the correct pitch.

As the gage-block 28 and timber thereon moves towards the outfeed end of the machine the cutter knives produce the finished cut 23 as in the manner illustrated at FIG. 4. When the gage-block and timber move past the infeed roll, the outfeed roll will be gripping the finished scarf cut 23 to pull the board and block past the cutter head 17 to finish cutting the scarf. This roll will then move the board and block past the pressure bar 18 and finally eject the timber when in the position illustrated at FIG. 5.

The simplicity and economy of this attachment is at once manifest and it is immediately apparent that the natural movements and operations of the planer are fully taken advantage of by this simple attachment S. With this attachment, it is possible to produce a large number of precisely cut scarf joints in a very short period of time. Moreover, only a single operator is needed for this finishing operation, for he merely has to stand at the outfeed end of the machine (in contrast with the usual practice of an operator standing at the infeed end of the machine) and to feed timber having rough cut scarf ends 22 backwards into the machine and in the channel 27. The lumber jams against the inclined top surface 29 and the infeed roll 14. The planer then takes over and ejects the timber with a finished scarf cut. The gage block 28 returns to its initial position and the machine is ready to repeat the operation. Scarf cuts are made as fast as an operator can feed material to the machine.

The unit illustrated at FIGS. 6 through 9 is a modified construction of the gage block 28a and is especially adapted for precise control of the finished scraf cut with respect to the edge 24. A rough-cut scarf surface will not be accurate and the thickness of the edge point 24 will vary considerably. It is often desirable to have a very narrow edge especially where the scarf cut is on finished lumber, for example an edge of 1/32-inch to 1/64-inch may be required. In the embodiment illustrated at FIGS. 1 to 5, this is not possible because when the rough-cut scarf surface is jammed against the spring-mounted infeed roll 14, the deflection of the infeed roll will be controlling and when the finished scarf cut 23 is made the thickness of the edge 24 will vary. Actually, no two scarf cuts will have the same edge thickness. Therefore, in the embodiment illustrated at FIGS. 6 through 9, the timber is set on the modified gage block 28a with the edge 24 being abutted against a stop means and with the heel 36 of the scarf not contacting the infeed roll. The infeed roll will not take over to commence the scarf finishing operation until the timber is properly positioned on the gage block 28a.

The modified gage block is formed with a shelf 37 which lies in the channel 27 behind the trailing peak point 30 of the inclined surface 29. This shelf includes a pair of upstanding ears 38 which support a transverse shaft 39 which carries the aforesaid stop means. The stop means consists of an arm 40 which is pivotally mounted upon the shaft 39 to normally lie in a substantially horizontal position with the extended end 41 of the arm being adjacent to the peak point 30 and extending a short distance above the peak point 30 to contact a scarf-edge 24.

The stop arm deflects downwardly and a spring 42 is positioned between the shelf 37 and the stop arm 40 to resiliently urge the arm upwardly and a corner 43 of the arm adjacent to the shaft bears against the shelf 37 to limit its upward movement.

Figure 8:
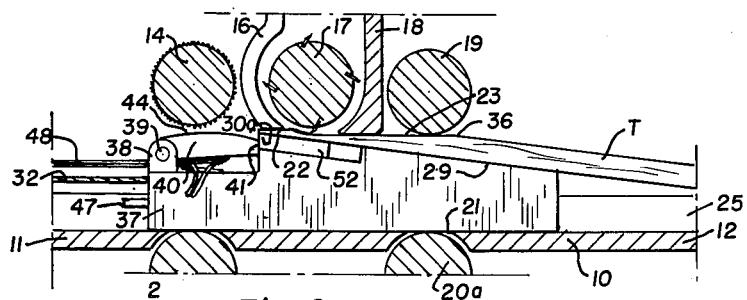
FIGURE 8 is a view similar to FIG. 6, but showing the scarf-finishing operation as being partially completed.
Figure 9:
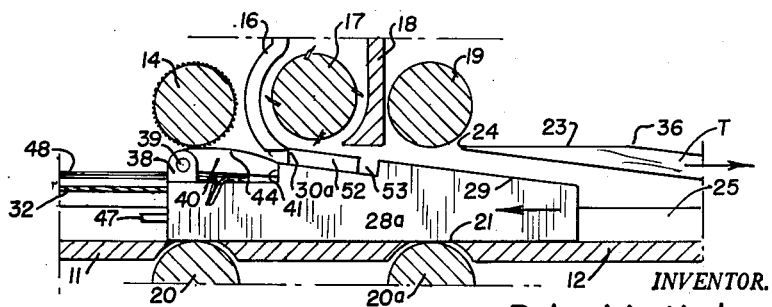
FIGURE 9 is a view similar to FIG. 6, but showing the scarf-finishing operation immediately after completion and the elements of the scarfing device returning to their initial position.

The top surface of this arm 40 is convexed or arched as at 44 to provide a curvature which, in contacting the infeed roll 14 and chip breaker fingers 16, will depress the extended end 41 below the cutting surface of the cutter head 17 as in the manner illustrated at FIGS. 8 and 9. Thus, the arm is pushed out of the way of the cutter head 17 when the finished scarf cut 23 is being completed.

Figure 7:
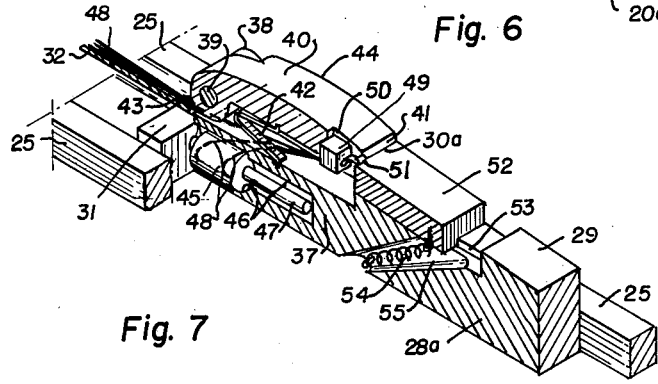
FIGURE 7 is an isometric, fragmentary, sectional detail of portions of the modified scarfing attachment to illustrate operative elements within the attachment.

In order to abut a rough-cut scarf edge 24 against the arm end 41, the stop 31 in the channel 27 must be shifted towards the infeed end of the planer to a position where the heel 36 of the rough-cut scarf is in advance of the infeed roll and the timber T is not contacting the infeed roll. It therefore becomes desirable to provide a shifting means to move the gage block 28 a short distance towards the infeed rolls, sufficient to move the heel of the rough-cut scarf thereunder and to permit the power feeding operation to commence. This may be accomplished by a manual push or by a simple automatic thrust means as illustrated at FIG. 7. The means include a solenoid 45 which is formed in a conventional manner, such as a cylindrical shaped coil of wire having an axially-centered, cylindrical passageway therethrough adapted to receive and hold an armature. This solenoid is mounted and affixed within a suitable socket 46 at the trailing end of the shelf 37. The armature 47 formed as a cylindrical rod is slidably mounted in the solenoid with one end extending into a continuation of the socket 46 and beyond the solenoid with the other end thereof being substantially flush to the trailing end of the shelf 37 when retracted and being thereby adapted to abut against the stop 31 when the block 28a is also abutted against the stop 31.

The solenoid is suitably energized by an electric conduit 48 which may be conveniently brought to the block 28a as by being aligned with the retrieving cable 32. This conduit leads from a power source to the solenoid in any suitable manner and the circuit of the conduit 48 includes a switch 49 which is mounted in a slot 50 in the arm 40. The switch includes an actuating finger 51 which when open, extends beyond the end 41 of the arm. It follows that whenever the edge 24 of a rough cut scarf joint is positioned to contact the arm end 41 it also contacts and closes the switch. The resulting energization of the solenoid 45 forcibly projects the armature 47 out of the block 28a and against the stop 31 to push the block 28a away from the stop and the heel of the scarf under and in contact with the infeed roll 14 to perform the scarf finishing operation.

In most planer settings the spring-mounted infeed roll 14 and the chip breaker fingers 16 are set a short distance below the cutting plane of the cutter head. These settings of the infeed roll and fingers determine the height of the peak point 30 of the gage block for this point must clear these members in returning to its initial position. It follows that for some settings the peak point may have as much as one-eighth inch clearance below the cutting plane of the cutter, and with such clearance a narrower scarf edge 24 cannot be properly cut.

To avoid this disadvantage, the modified unit 28a may include a slide 52 which is mounted in a suitable groove 53 in the top portion of the gage block 28a with the top surface of the block forming a portion of the surface 29 and the top point 30a thereof forming the peak point of the surface. A spring 54 is mounted in a suitable socket 55 in the gage block and underneath the slide 52 at an angle which tends to hold the slide in its groove and which pulls the slide upwardly and to its upper position against the arm end 41. In this position the peak point 30a may be at any selected distance below the cutting plane, such as 1/64 of an inch. In the forward pass with a timber in place and with the scarf-edge 24 at this peak point, the edge of the finished cut will then be 1/64-inch and the material will pass through the planer. In the return, however, when the infeed roll 14 and chip breaker fingers drop below the cutter plane, the peak point 30a will strike them, as illustrated at FIG. 9, but the slide 52 will merely shift its position and pass below these members to return to its top position against the arm end 41 when the gage block 28a is returned to its initial position.

It is to be noted that this modified construction will be operated the same as hereinbefore described, with a single operator standing at the outfeed end of the machine, and feeding timbers having rough-cut scarf joints backwards into the machine, with the machine ejecting the timbers with finished joints.

While I have now described preferred constructions of my invention in considerable detail, it is obvious that others skilled in the art can devise and build other alternate and equivalent constructions which are nevertheless within the spirit and scope of my invention. Hence, I desire that my protection be limited, not by the constructions illustrated and described, but only by the proper scope of the appended claims.

I claim:

1. In combination with a planer of the type having a table, a cutter head mounted over the table transversely to the normal longitudinal direction of forward material movement across the table, an infeed roll mounted alongside and at the infeed side of the cutter head adapted to push material on the table forwardly and into the cutter and an outfeed roll mounted alongside and at the outfeed side of the cutter adapted to pull material on the table forwardly and from the cutter, a scarfing attachment for planing a rough cut scarf joint at the end of a timber and comprising, a pair of longitudinally disposed members mounted upon the table underneath the cutter head in mutual spaced parallelism to form a channel-like guideway upon the table, a gage block mounted upon the table in the guideway for movement along the guideway, the top surface of said block being sloped downwardly from a peak point at the trailing end of the block, with respect to the direction of material movement, and at an inclination which corresponds to a selected scarf pitch whereby, when the end of the timber is placed on the block with the timber extending from the outfeed side of the planer and with the end portion contacting the infeed roll, the timber and block are moved first by the infeed roll and then by the outfeed roll through the planer with the cutter planing a scarf joint on the upper surface of the end portion of the timber above the block.

2. In the combination defined in claim 1, a stop on the guideway adapted to stop the block at a selected position underneath the infeed roll and means adapted to return the block to the stop after it is moved from the infeed side to the outfeed side thereof as when cutting a scarf joint.

3. In combination with a planer of the type having a table, a cutter head mounted over the table transversely to the normal longitudinal direction of forward material movement across the table, an infeed roll mounted alongside and at the infeed side of the cutter head adapted to push material on the table forwardly and into the cutter and an outfeed roll mounted alongside and at the outfeed side of the cutter adapted to pull material on the table forwardly and from the cutter, a scarf finishing attachment for finishing a rough cut scarf joint at the end of a timber, comprising a pair of longitudinally disposed members mounted upon the table underneath the cutter head in mutual spaced parallelism to form a channel like guideway along the table, a gage block mounted upon the table in the guideway for movement along the guideway, the top surface of said block being sloped downwardly from a peak point near the trailing end of the block, with respect to the direction of material movement, and at an inclination which corresponds to selected scarf pitch, with the top surface being adapted to hold to said end portion of a timber when the timber extends from the outfeed side of the planer, with the rough cut scarf joint being at the upper face of the timber and being directly over the block, a stop on the guideway adapted to hold the block at a selected position underneath the infeed roll to permit a timber to be extended from the outfeed side of the planer and upon and against the upper surface of the block with the heel portion of the scarf joint being wedged against the infeed roll whereby the timber and block are moved first by the infeed roll and then by the outfeed roll toward the outfeed side of and through the planer with the scarf joint being finished as it moves under the cutter and with the outfeed roll pulling the scarf joint through the planer and ejecting of the timber from the machine.

4. In the organization defined in claim 3, said guideway channel extends to the outfeed end of the planer with the width of the channel being slightly greater than the width of a timber whereby to facilitate holding the timber in proper alignment when placing it in the planer and on the top surface of the block.

5. In combination with a planer of the type having a table and cutter head mounted over the table transversely to the normal direction of material movement across the table, an infeed roll mounted alongside and at the infeed side of the cutter head adapted to push material on the table into the cutter and an outfeed roll mounted alongside and at the outfeed side of the cutter adapted to pull material on the table from the cutter, a scarf finishing attachment for finishing a rough cut scarf joint at the end portion of a timber, comprising, a guide means mounted upon the table underneath the cutter head and in the direction of material movement, a gage block mounted upon the table in the guide means for movement along the guide means, the top surface of said block being sloped downwardly from a peak point near the trailing end of the block, with respect to the direction of material movement, and at an inclination which corresponds to a selected scarf pitch, with the top surface being adapted to hold to said end portion of a timber when the timber extends from the outfeed side of the planer, with the rough cut scarf joint being at the upper face of the timber being directly over the block, a stop on the guide means adapted to hold the block at a selected position ahead of the infeed roll, a stop on the block at the trailing side of the peak point adapted to contact the edge of the rough cut scarf joint when the timber is placed thereon from the outfeed end of the planer, to hold the edge of the joint at the peak edge of the block, whereby when the timber is so placed on the block, the block and the timber may be pushed against the infeed roll till the heel of the rough cut scarf joint contacts the infeed roll for subsequent movement by the infeed and outfeed rolls through the planer.

6. In the combination defined in claim 5, means for pushing the block from the guide stop and towards the infeed roll responsive to placing the edge of the rough cut scarf joint against the block stop.

7. In the combination defined in claim 5, means for retracting the block stop to a point below the cutter head cutting surface when the block passes underneath the cutter head.

8. In the combination defined in claim 5, said block stop including a substantially horizontally disposed member trailing the peak edge of the block, a hinge on the block connecting with the trailing end of the member pivotally supporting said member and with the upper surface of said member being arched above the peak point whereby to be contacted and depressed by the infeed roll to a level below the cutter head cutting surface when the peak point of the block passes underneath the cutter head.

9. In the combination defined in claim 5, means for returning the block to the guide stop whenever it is moved forward and subsequently released as when finishing a scarf joint, and said peak point being formed by an inclined sliding block adapted to slide below its normal elevation when contacted by the infeed roll or like obstruction during such return movement.

References Cited in the file of this patent

UNITED STATES PATENTS

| | | |
|---|---|---|
| 951,320 | Lechtenberg | Mar. 8, 1910 |
| 1,634,789 | Melby | July 5, 1927 |
| 1,796,185 | Beerworth | Mar. 10, 1931 |
| 1,944,631 | Bergstrom | Jan. 23, 1934 |
| 2,375,447 | Stuart | May 8, 1945 |
| 2,491,106 | Grasser | Dec. 13, 1949 |
| 2,574,912 | Dennison | Nov. 13, 1951 |
| 2,894,545 | Wirth | July 14, 1959 |
| 2,987,088 | Dennison | June 6, 1961 |